(12) United States Patent
Sevindik et al.

(10) Patent No.: US 10,021,713 B1
(45) Date of Patent: Jul. 10, 2018

(54) SYSTEMS AND METHODS FOR SCHEDULING WIRELESS TRANSMISSIONS BASED ON SERVICE PROVIDER

(71) Applicant: Sprint Spectrum LP, Overland Park, KS (US)

(72) Inventors: Volkan Sevindik, Reston, VA (US); Yu Zhou, Herndon, VA (US); Muhammad Ahsan Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 777 days.

(21) Appl. No.: 14/534,381

(22) Filed: Nov. 6, 2014

(51) Int. Cl.
*H04W 72/12* (2009.01)
*H04W 28/02* (2009.01)
*H04W 52/28* (2009.01)

(52) U.S. Cl.
CPC ... *H04W 72/1242* (2013.01); *H04W 28/0226* (2013.01); *H04W 72/1252* (2013.01); *H04W 52/28* (2013.01)

(58) Field of Classification Search
CPC ............. H04W 28/08; H04W 72/1242; H04W 72/1252; H04W 28/0226
See application file for complete search history.

(56) References Cited

U.S. PATENT DOCUMENTS

| | | | | |
|---|---|---|---|---|
| 8,787,331 B2 * | 7/2014 | Liu | ................... | H04W 36/0022 370/338 |
| 9,030,953 B2 * | 5/2015 | Purohit | ...................... | H04L 1/04 370/252 |
| 2013/0336229 A1 | 12/2013 | Kakadia et al. | | |

* cited by examiner

*Primary Examiner* — Walter Divito
*Assistant Examiner* — Anthony Luo

(57) ABSTRACT

Systems and methods are described for scheduling wireless transmissions from an access node based on service provider. Data may be communicated between an access node and a plurality of wireless devices, wherein each of the plurality of wireless devices uses one of a first service provider and a second service provider to communicate with an access node. Transmissions may then be scheduled from the access node to the plurality of wireless devices based on a provider priority for the service providers and a backhaul congestion for each of the service providers.

18 Claims, 5 Drawing Sheets

SYSTEMS AND METHODS FOR SCHEDULING WIRELESS TRANSMISSIONS BASED ON SERVICE PROVIDER

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold). For example, a communication link may experience a large amount of data traffic and consequently the efficiency of the system may suffer. Accordingly, a system that effectively balances load and considers utilization of system resources may provide an efficient service to users.

Overview

Systems and methods are described for scheduling wireless transmissions from an access node based on service provider. Data may be communicated between an access node and a plurality of wireless devices, wherein each of the plurality of wireless devices uses one of a first service provider and a second service provider to communicate with an access node. Transmissions may then be scheduled from the access node to the plurality of wireless devices based on a provider priority for the service providers and a backhaul congestion for each of the service providers.

DETAILED DESCRIPTION

Figure 1:
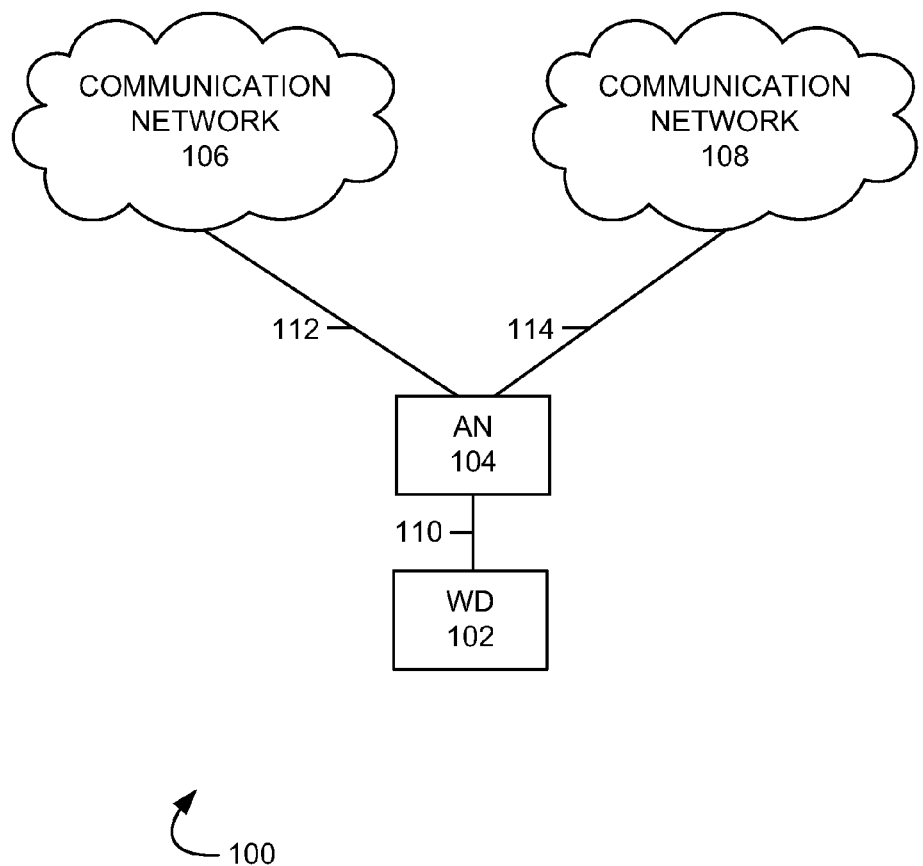
FIG. 1 illustrates an exemplary communication system to schedule wireless transmissions from an access node based on service provider.

FIG. 1 illustrates an exemplary communication system 100 to schedule wireless transmissions from an access node based on service provider comprising wireless devices 102, access node 104, communication networks 106 and 108, and communication links 110, 112, and 114. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 106 or access node 104 and communication network 108, which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented.

Access node 104 is a network node capable of providing wireless communications to wireless device 102, and can be, for example, a base transceiver station, a radio base station, and an eNodeB device. Access node 104 may communicate with communication network 106 over communication link 112, and communication network 108 over communication link 114. Although only access node 104 is illustrated in FIG. 1, wireless device 102 (and other wireless devices not depicted) can be in communication with a plurality of access nodes and/or small cells. The plurality of access nodes and/or small cells can be associated with different networks and can support different communication protocols and radio access technologies.

Communication networks 106 and 108 can be a wired and/or wireless communication networks, and can comprise processing nodes, routers, gateways, and physical and/or wireless data links for carrying data among various network elements, including combinations thereof, and can include a local area network, a wide area network, and an internetwork (including the Internet). Communication networks 106 and 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication networks 106 and 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication networks 106 and 108 may also comprise a wireless network, including base stations, wireless communication nodes, telephony switches, internet routers, network gateways, computer systems, communication links, or some other type of communication equipment, and combinations thereof.

In an embodiment, communication networks 106 and 108 may comprise separate core networks used to provide wireless services (e.g., data and/or voice services) to one or more wireless devices. For example, wireless devices may connect to communication networks 106 and 108 via access node 104. In an embodiment, communication networks 106 and 108 may both connect to a similar external network (e.g., the Internet) in order to route data traffic to and from wireless devices connected to the communication networks.

Communication links 110, 112, and 114 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In an embodiment, system 100 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In operation, access node 104 may establish communication with wireless device 102 such that access node 104 provides the wireless device access to a communication network (e.g., communication network 106 or 108). Access node 104 may schedule transmissions (e.g., physical resource block transmissions) to wireless devices in communication with the access node using a scheduler. For example, a packet may be received at access node 104 that is associated with wireless device 102, and access node 104 may use a scheduler to schedule transmissions to wireless device 102 to communicate the data from the received packet.

In an embodiment, wireless devices may communicate with access node 104 using one of a first service provider or a second service provider. A service provider may comprise an organization (e.g., company, subsidiary, and the like) comprising a communication network that provides wireless services (e.g., data and voice services) to a wireless device. In an embodiment, a service provider may comprise a mobile virtual network operator (MVNO). An MVNO may be a wireless communications service provider that enters into an agreement with a mobile network operator to obtain access to portions of the mobile network operator's network. In an embodiment, one of the first service provider and second service provider may comprise the mobile network operator while the other comprises an MVNO. In an example, the first service provider and second service provider may share access node 104. In order to connect a wireless device to an external network (e.g., the Internet) or provide wireless service (e.g., data or voice services) to the wireless device, each service provider may connect to a different communication network (e.g., core network) via access node 104. In an embodiment, the first service provider may provide wireless services to a wireless device using communication network 106 and the second service provider may provide wireless services to a wireless device using communication network 108.

In an embodiment where at least one of the first service provider and second service provider comprises an MVNO, the service providers may share one of communication network 106 or 108. In this example, both service providers may provide wireless services to a wireless device using the same communication network. In an embodiment where service providers share the same communication network, the backhaul congestion for the service providers may also be the same.

In an embodiment, access node 104 may communicate with a plurality of wireless devices, where some of the wireless devices use the first service provider and others use the second service provider. Each of the service providers may experience various network conditions while communicating with the wireless devices. Accordingly, a system that schedules transmissions from an access node while considering network conditions for the different service providers may provide efficient wireless service to users of the system.

Systems and methods are described for scheduling wireless transmissions from an access node based on service provider. Data may be communicated between an access node and a plurality of wireless devices, wherein each of the plurality of wireless devices uses one of a first service provider and a second service provider to communicate with an access node. Transmissions may then be scheduled from the access node to the plurality of wireless devices based on a provider priority for the service providers and a backhaul congestion for each of the service providers.

Figure 2:
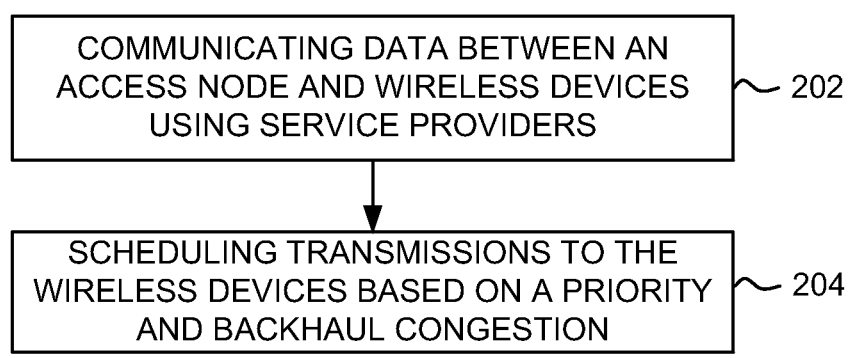
FIG. 2 illustrates an exemplary method for scheduling wireless transmissions from an access node based on service provider.

FIG. 2 illustrates an exemplary method for scheduling wireless transmissions from an access node based on service provider. The method will be discussed with reference to the exemplary communication system 100 illustrated in FIG. 1, however, the method can be implemented with any suitable communication system.

Referring to FIG. 2, at step 202, data may be communicated between an access node and a plurality of wireless devices, wherein each of the plurality of wireless devices uses one of a first service provider and a second service provider to communicate with an access node. For example, access node 104 may be in communication with a plurality of wireless devices, where each of the wireless devices uses one of the first service provider and the second service provider to communicate with the access node. In this embodiment, wireless devices that communicate with the access node using the first service provider may connect to communication network 106 and wireless devices that communicate with the access node using the second service provider may connect to communication network 108.

At step 204, transmissions may then be scheduled from the access node to the plurality of wireless devices based on a provider priority for the service providers and a backhaul congestion for each of the service providers. For example, transmissions may be scheduled from access node 104 to the plurality of wireless devices in communication with access node 104, each using one of the first service provider or the second service provider to communicate with the access node. The scheduling may be based on a service provider priority for the first and second service providers. The scheduling may further be based on a backhaul congestion for each of the service providers. For example, the scheduling may be based on a backhaul congestion for communication network 106 and communication network 108.

Figure 3:
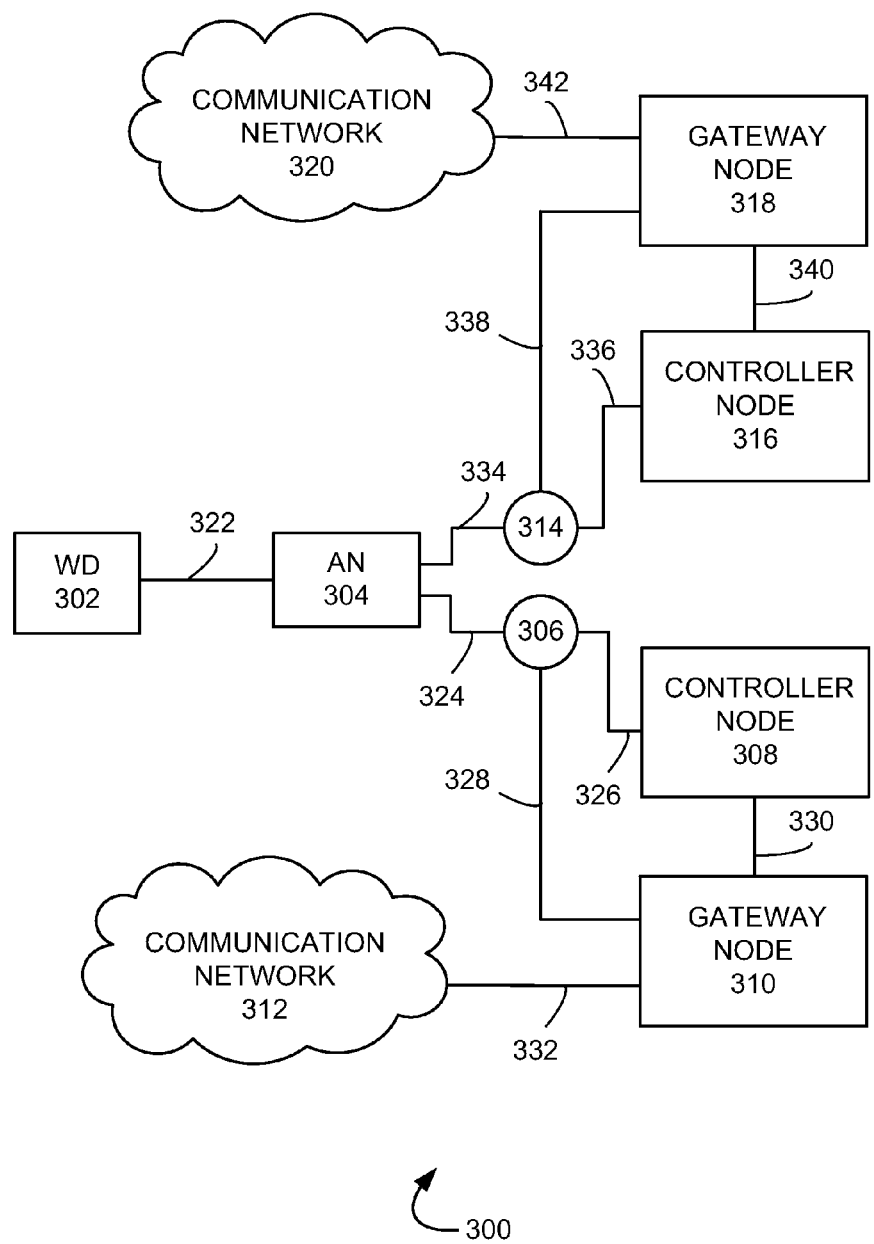
FIG. 3 illustrates another exemplary system to schedule wireless transmissions from an access node based on service provider.

FIG. 3 illustrates another exemplary communication system 300 to schedule wireless transmissions from an access node based on service provider. Communication system 300 may comprise wireless device 302, access node 304, communication network routers 306 and 314, controller nodes 308 and 316, gateway nodes 310 and 318, communication networks 312 and 320, and communication links 322, 324, 326, 328, 330, 332, 334, 336, 338, 340 and 342. Other network elements may be present in the communication system 300 to facilitate communication but are omitted for clarity, such as base stations, base station controllers, gateways, mobile switching centers, dispatch application processors, and location registers such as a home location register or visitor location register.

Wireless device 302 can be any device configured to communicate over communication system 300 using a wireless communication link. For example, wireless device 302 can include a cell phone, a smart phone, a computing platform such as a laptop, palmtop, or a tablet, a personal digital assistant, or an internet access device, and combinations thereof.

Access node 304 is a network node capable of providing wireless communications to wireless device 302, and can be, for example, a base transceiver station, a radio base station, or an eNodeB device. In an embodiment, access node 304 can comprise a serving access node for wireless device 302. Access node 304 may communicate with communication network routers 306 and 314 over communication links 324 and 334, respectively.

Controller nodes 308 and 316 can be any network node configured to manage services within system 300. Controller nodes 308 and 316 may provide other control and management functions for system 300. The controller nodes 308 and 316 can be a single device having various functions or a plurality of devices having differing functions. For example, controller nodes 308 and 316 can include at least one of a multi-cell/multicast coordination entity (MCE), a mobility management entity (MME), a mobile switching center (MSC), a radio network controller (RNC), and a combination thereof.

Controller nodes 308 and 316 can comprise a processor and associated circuitry to execute or direct the execution of computer-readable instructions to obtain information. Controller nodes 308 and 316 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller nodes 308 and 316 can receive instructions and other input at a user interface. Controller nodes 308 and 316 can comprise a processor and associated circuitry to execute or direct the execution of computer-readable instructions to obtain information.

Gateway nodes 310 and 318 are network elements which can comprise a processor and associated circuitry to execute or direct the execution of computer-readable instructions. Gateway nodes 310 and 318 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway nodes 310 and 318 can provide instructions to access node 304 related to channel selection in communications with wireless device 302 (and other wireless devices not shown). For example, gateway nodes 310 and 318 can comprise at least one of a serving gateway (SGW), a packet data network gateway (PDNGW), a cellular gateway (CGW), and a combination thereof.

Communication networks 312 and 320 can be wired and/or wireless communication networks, and can comprise processing nodes, routers, gateways, and physical and/or wireless data links for carrying data among various network elements, including combinations thereof, and can include a local area network, a wide area network, and an internetwork (including the Internet). Communication networks 312 and 320 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication networks 312 and 320 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

In an embodiment, controller node 308, gateway node 310, and communication network 312 may comprise a first core network, and controller node 316, gateway node 318, and communication network 320 may comprise a second core network. Access node 304 may connect to the first core network using communication network router 306 and may connect to the second core network using communication router 314. Each core network may route data traffic such that wireless services may be provided to wireless devices in communication with access node 304. In an embodiment, communication networks 312 and 320 may both connect to a similar external network (e.g., the Internet) in order to route data traffic to and from wireless devices connected to the communication networks.

Communication links 322, 324, 326, 328, 330, 332, 334, 336, 338, 340 and 342 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 304, controller nodes 308, gateway node 310, and communication network 312 or to facilitate communication among access node 304, controller nodes 316, gateway node 318, and communication network 32. These other network elements are omitted for clarity, including additional processing nodes, routers, gateways, and physical and/or wireless data links for carrying data among the various network elements. In an embodiment, any of controller nodes 308 and 316, gateway nodes 310 and 318, and one or more modules of access node 304 may perform all or parts of the methods of FIGS. 2 and 4.

In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In operation, access node 304 may establish communication with wireless device 302 such that access node 304 provides the wireless device access to a communication network (e.g., communication network 312 or 320). Access node 304 may schedule transmissions (e.g., physical resource block transmissions) to wireless devices in communication with the access node using a scheduler. For example, a packet may be received at access node 304 that is associated with wireless device 302, and access node 304 may use a scheduler to schedule transmissions to wireless device 302 to communicate the data from the received packet.

In an embodiment, wireless devices may communicate with access node 304 using one of a first service provider or a second service provider. A service provider may comprise an organization (e.g., company, subsidiary, and the like) comprising a communication network that provides wireless services (e.g., data and voice services) to a wireless device. In an embodiment, a service provider may comprise a mobile virtual network operator (MVNO). An MVNO may be a wireless communications service provider that enters into an agreement with a mobile network operator to obtain access to portions of the mobile network operator's network. In an embodiment, one of the first service provider and second service provider may comprise the mobile network operator while the other comprises an MVNO. In an example, the first service provider and second service provider may share access node 304. In order to connect a wireless device to an external network (e.g., the Internet) or provide wireless service (e.g., data or voice services) to the wireless device, each service provider may connect to a different communication network (e.g., core network) via access node 104. In an embodiment, the first service provider may use access node 304 to connect to a first core network comprising controller node 308, gateway node 310, and communication network 312 via communication network router 306. The second service provider may use access node 304 to connect to a second core network comprising controller node 316, gateway node 318, and communication network 320 via communication network router 314.

In an embodiment, access node 304 may communicate with a plurality of wireless devices, where some of the wireless devices use the first service provider and others use the second service provider. Each of the service providers may experience various network conditions while communicating with the wireless devices. Accordingly, a system that schedules transmissions from an access node while considering network conditions for the different service providers may provide efficient wireless service to users of the system.

Systems and methods are described for scheduling wireless transmissions from an access node based on service provider. Data may be communicated between an access node and a plurality of wireless devices, wherein each of the plurality of wireless devices uses one of a first service provider and a second service provider to communicate with an access node. Transmissions may then be scheduled from the access node to the plurality of wireless devices based on a provider priority for the service providers and a backhaul congestion for each of the service providers.

Figure 4:
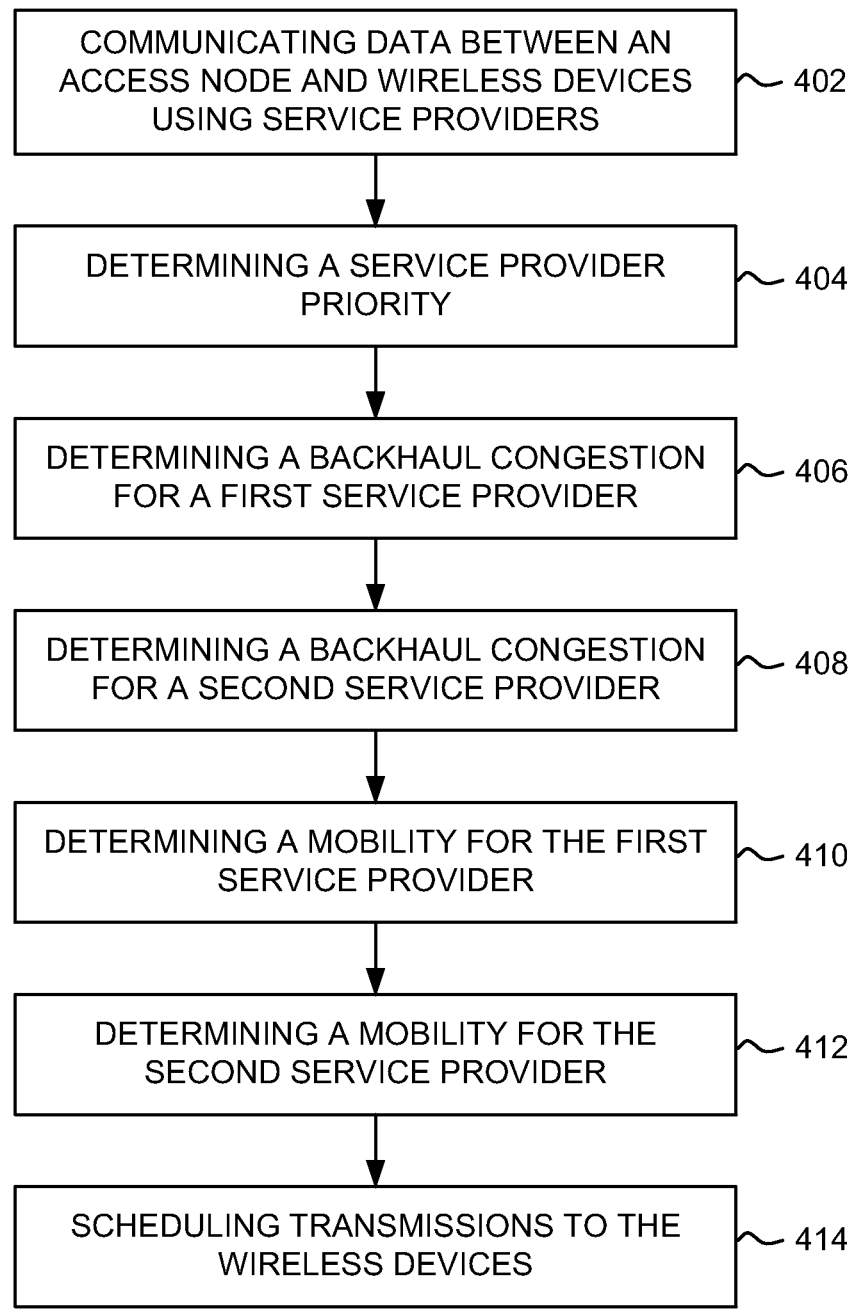
FIG. 4 illustrates another exemplary method for scheduling wireless transmissions from an access node based on service provider.

FIG. 4 illustrates an exemplary method for scheduling wireless transmissions from an access node based on service provider. The method will be discussed with reference to the exemplary communication system 300 illustrated in FIG. 3, however, the method can be implemented with any suitable communication system.

Referring to FIG. 4, at step 402, data may be communicated between an access node and a plurality of wireless devices, wherein each of the plurality of wireless devices uses one of a first service provider and a second service provider to communicate with an access node. For example, access node 304 may be in communication with a plurality of wireless devices, where each of the wireless devices uses one of the first service provider and the second service provider to communicate with the access node. In this embodiment, wireless devices that communicate with the access node using the first service provider may connect to communication network 312 and wireless devices that communicate with the access node using the second service provider may connect to communication network 316.

At step 404, a service provider priority may be determined. For example, a priority for the first service provider and the second service provider may be determined. In an embodiment, the first service provider may comprise a higher default priority than the second service provider. As such, wireless devices that communicate with access node 304 using the first service provider may receive scheduling priority over wireless devices that communicate with access node 304 using the second service provider.

In an embodiment, the service provider priority may be based on processing load at access node 304. For example, the default priority for the first service provider and the second service provider may be adjusted based on the processing load at access node 304. The difference between the first service provider priority and the second service provider priority may decrease as the processing load at access node 304 increases. When the processing load at access node 304 meets a load criteria (e.g., load threshold) the priorities of the first service provider and the second service provider may be equal.

In an embodiment, processing load at access node 304 may be based on one or more of resource block utilization for the access node, number of connections to wireless devices (e.g., RRC connections), memory utilization, processor utilization, and any other suitable metric. The load threshold may comprise a resource block utilization threshold, a threshold number of connections to wireless devices, a memory utilization threshold, a processor utilization threshold, and any other suitable threshold.

At step 406, a backhaul congestion for the first service provider may be determined. Backhaul may comprise intermediate links between access node 304 and the first core network (e.g., controller node 308, gateway node 310, and communication network 312). For example, communication network router 306 and the communication links that connect the router to access node 304 and the first core network may comprise the backhaul for the first service provider. Various network elements, including routers, communication links, processing nodes, and any other suitable network elements may also be included in the backhaul for the first service provider.

In an embodiment, a backhaul congestion for the first service provider may be determined based on a congestion for communication links used by the first service provider to connect the access node to a first communication network (e.g. core network). For example, the congestion for communication network router 306 and the communication links that connect the router to access node 304 and the first core network may comprise the backhaul congestion for the first service provider.

In an embodiment, backhaul congestion may be based on the utilization of the backhaul communication links. For example, backhaul congestion may be based on a usage for the communication links, a data rate for the communication links (e.g., average data rate), a throughput for the communication links (e.g., average throughput), and any other suitable congestion metric.

At step 408, a backhaul congestion for the second service provider may be determined. Backhaul may comprise intermediate links between access node 304 and the second core network (e.g., controller node 316, gateway node 318, and communication network 320). For example, communication network router 314 and the communication links that connect the router to access node 304 and the second core network may comprise the backhaul for the second service provider. Various network elements, including routers, communication links, processing nodes, and any other suitable network elements may also be included in the backhaul for the second service provider.

In an embodiment, a backhaul congestion for the second service provider may be determined based on a congestion for communication links used by the second service provider to connect the access node to a second communication network (e.g. core network). For example, the congestion for communication network router 314 and the communication links that connect the router to access node 304 and the second core network may comprise the backhaul congestion for the second service provider.

In an embodiment where first service provider and second service provider share the same communication network, the backhaul congestion for the service providers may be the same. For example, where one of the service providers comprises an MVNO, the service providers may provide wireless services to wireless devices using a shared communication network. In this example, the service providers may use the same communication links to connect the access node to the shared communication network, and thus the backhaul congestion for the service providers may be the same.

At step 410, a mobility may be determined for the first service provider. For example, a mobility for the first service provider may be based on the mobility for wireless devices that communicate with access node 304 using the first service provider. In an embodiment, the mobility for the first service provider may be based on the mobility for wireless devices that communicate with any access node (or access point) connected to the first core network (e.g., controller node 316, gateway node 318, and communication network 320) using the first service provider.

In an embodiment, a mobility may be determined for the wireless devices using the first service provider based on movement vectors for the wireless devices. The movement vectors may be determined using signal levels reported from the wireless devices (e.g., to access points connected to the first core network). In another example, mobility may be based on a global positioning system (GPS) signal from the wireless devices, and a movement vector may be determined based on each of the signals.

In an embodiment, a mobility for the first service provider may comprise an aggregate of the determined mobility for the wireless devices communicating with access node 304 using the first service provider. For example, a wireless device with a mobility (e.g., movement vector) that meets a mobility criteria (e.g., movement vector threshold) may comprise a mobile wireless device. The mobility for the first service provider may comprise a percentage of mobile wireless devices (e.g., relative to the total number of wireless devices communicating with access node 304 using the first service provider).

At step 412, a mobility may be determined for the second service provider. For example, a mobility for the second service provider may be based on the mobility for wireless devices that communicate with access node 304 using the second service provider. In an embodiment, the mobility for the second service provider may be based on the mobility for wireless devices that communicate with any access node (or access point) connected to the second core network (e.g., controller node 316, gateway node 318, and communication network 320) using the second service provider.

In an embodiment, a mobility may be determined for the wireless devices using the second service provider based on movement vectors for the wireless devices. The movement vectors may be determined using signal levels reported from the wireless devices (e.g., to access points connected to the second core network). In another example, mobility may be based on a global positioning system (GPS) signal from the wireless devices, and a movement vector may be determined based on each of the signals.

In an embodiment, a mobility for the second service provider may comprise an aggregate of the determined mobility for the wireless devices communicating with access node 304 using the second service provider. For example, a wireless device with a mobility (e.g., movement vector) that meets a mobility criteria (e.g., movement vector threshold) may comprise a mobile wireless device. The mobility for the second service provider may comprise a percentage of mobile wireless devices (e.g., relative to the total number of wireless devices communicating with access node 304 using the second service provider).

At step 414, transmissions may be scheduled from the access node to the plurality of wireless devices based on a provider priority for the service providers and a backhaul congestion for each of the service providers. In an embodiment, access node 304 may receive a plurality of packets associated with wireless devices (e.g., transmitted from a network connected device, such as a server, to the wireless devices) in communication with access node 304. The access node may then schedule transmissions (e.g., resources blocks) for the wireless devices such that the data received in the packets may be transmitted to the associated wireless device. For example, transmissions may be scheduled from access node 304 to the plurality of wireless devices using one of the first service provider or the second service provider to communicate with access node 304.

In an embodiment, the scheduler may schedule transmissions to wireless devices based on a calculated scheduling priority, SP. For example, the calculated scheduling priority may be based on a service provider priority associated with a wireless device, a backhaul congestion for a service provider associated with a wireless device, and a determined mobility for a service provider associated with a wireless device, a channel quality (CQI) for a wireless device, an average data rate for a wireless device (R(t)), and any other suitable metric.

In an embodiment, scheduling priority for a wireless device communicating using a particular carrier (e.g., one of the first carrier or the second carrier) may be calculated using the following equation: $SP=\{(\text{carrier priority}) \times ((1/\text{congestion})+(1/\text{mobility})) \times CQI/R(t)\}$, where carrier priority may comprise the determined carrier priority for the particular carrier (as described herein), congestion may comprise the determined backhaul congestion for the particular carrier (as described herein), mobility may comprise the determined mobility for the particular carrier (as described herein), CQI may comprise a channel quality for the wireless device, and R(t) may comprise an average data rate for the wireless device.

In this embodiment, carrier priority may be directly proportional to the calculated scheduling priority. For example, a greater carrier priority for the particular carrier may increase the calculated scheduling priority and a smaller carrier priority for the particular carrier may decrease the calculated scheduling priority. Carrier congestion may be inversely proportional to the calculated scheduling priority. For example, a greater carrier congestion for the particular carrier may decrease the calculated scheduling priority and a smaller carrier congestion for the particular carrier may increase the calculated scheduling priority. Carrier mobility may also be inversely proportional to the calculated scheduling priority. For example, a greater carrier mobility for the particular carrier may decrease the calculated scheduling priority and a smaller carrier mobility for the particular carrier may increase the calculated scheduling priority.

In an embodiment, a percentage of transmissions (e.g., resources blocks) transmitted to wireless devices communicating with each service provider may be tracked, and the scheduler may adjust the transmission schedule based on the tracking. For example, where the first service provider comprises a greater priority than the second service provider, a minimum percentage of transmissions (e.g., resource blocks) may be scheduled for wireless devices communicating using the second service provider (e.g., 30%, 25%, 20%, 15%, and the like).

In an embodiment, the scheduling priority may be calculated by adjusting a proportional fairness scheduling algorithm, such that the adjusted algorithm is based on a service provider priority associated with a wireless device, a backhaul congestion for a service provider associated with a wireless device, and a determined mobility for a service provider associated with a wireless device, a channel quality (CQI) for a wireless device, and an average data rate for a wireless device (R(t)).

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 5:
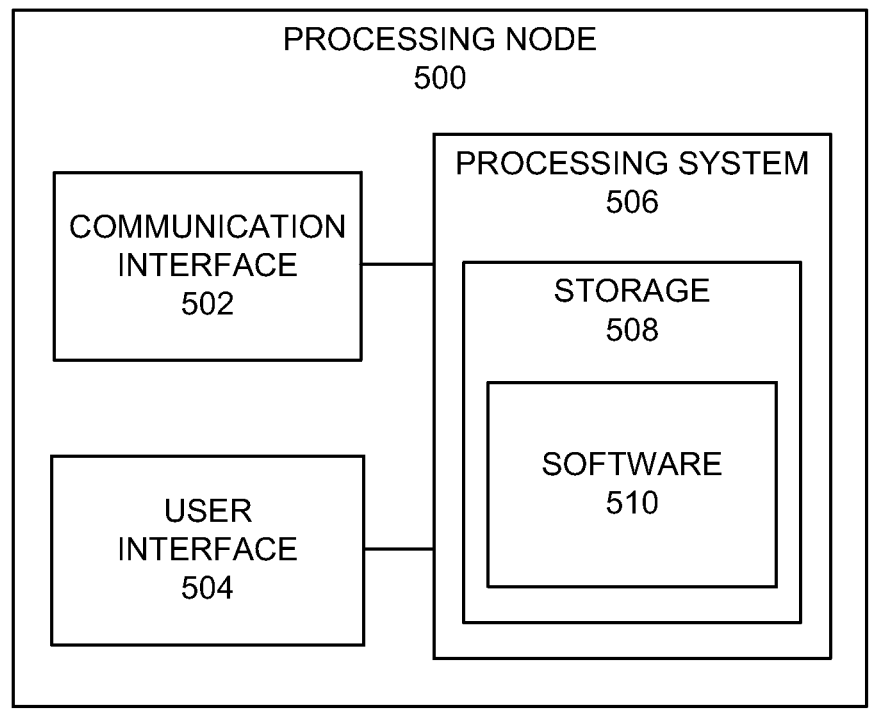
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to determine a communication access node for a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include controller nodes 308 and 316, and gateway nodes 310 and 318. Processing node 500 can also be an adjunct or component of a network element, such as an element of access nodes 104 or 304 and the like. Processing node 500 can also be another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for scheduling wireless transmissions from an access node based on service provider, the method comprising:

communicating data between an access node and a plurality of wireless devices, wherein each of the plurality of wireless devices uses one of a first service provider and a second service provider to communicate with the access node;

determining a backhaul congestion for the first service provider based on a congestion for a first set of backhaul communication links used by the first service provider to connect the access node to a first communication network;

determining a backhaul congestion for the second service provider based on a congestion for a second set of backhaul communication links used by the second service provider to connect the access node to a second communication network, wherein the first communication network is different from the second communication network; and scheduling transmissions to the plurality of wireless devices based on a provider priority for the service providers and a backhaul congestion for each of the service providers.

2. The method of claim 1, wherein the first service provider comprises a higher provider priority than the second service provider and wireless devices that communicate using the first service provider are scheduled transmissions with a higher priority than wireless devices that communicate using the second service provider.

3. The method of claim 2, wherein the provider priority is based on the access node processing load.

4. The method of claim 3, wherein the difference between the provider priority for the first service provider and the provider priority for the second service provider decreases as the access node processing load increases.

5. The method of claim 3, wherein transmissions scheduled for wireless devices that communicate using the second service provider meet a minimum percentage of scheduled transmissions.

6. The method of claim 1, further comprising:
scheduling transmissions to the plurality of wireless devices based on a provider priority for the service providers, a backhaul congestion for each of the service providers, and a determined mobility for each of the service providers.

7. The method of claim 6, further comprising:
determining a mobility for the first service provider based on a mobility for the wireless devices that communicate with the access node using the first service provider; and
determining a mobility for the second service provider based on a mobility for the wireless devices that communicate with the access node using the second service provider.

8. The method of claim 1, wherein the first service provider communicates over a first frequency band, the second service provider communicates over a second frequency band, and the first frequency band differs from the second frequency band.

9. The method of claim 1, wherein at least a portion of the first set of backhaul communication links comprise wired communication links and at least a portion of the second set of backhaul communication links comprise wired communication links.

10. A system for scheduling wireless transmissions from an access node based on service provider, the system comprising:
a processing node with a processor configured to:
communicate data between an access node and a plurality of wireless devices, wherein each of the plurality of wireless devices uses one of a first service provider and a second service provider to communicate with the access node;

determine a backhaul congestion for the first service provider based on a congestion for a first set of communication links used by the first service provider to connect the access node to a first communication network; and determine a backhaul congestion for the second service provider based on a congestion for a second set of communication links used by the second service provider to connect the access node to a second communication network, wherein the first communication network is different from the second communication network; and schedule transmissions to the plurality of wireless devices based on a provider priority for the service providers and a backhaul congestion for each of the service providers.

11. The system of claim 10, wherein the first service provider comprises a higher provider priority than the second service provider and wireless devices that communicate using the first service provider are scheduled transmissions with a higher priority than wireless devices that communicate using the second service provider.

12. The system of claim 11, wherein the provider priority is based on the access node processing load.

13. The system of claim 12, wherein the difference between the provider priority for the first service provider and the provider priority for the second service provider decreases as the access node processing load increases.

14. The system of claim 12, wherein transmissions scheduled for wireless devices that communicate using the second service provider meet a minimum percentage of scheduled transmissions.

15. The system of claim 10, wherein the processing node is further configured to:
schedule transmissions to the plurality of wireless devices based on a provider priority for the service providers, a backhaul congestion for each of the service providers, and a determined mobility for each of the service providers.

16. The system of claim 15, wherein the processing node is further configured to:
determine a mobility for the first service provider based on a mobility for the wireless devices that communicate with the access node using the first service provider; and
determine a mobility for the second service provider based on a mobility for the wireless devices that communicate with the access node using the second service provider.

17. The system of claim 10, wherein the first service provider communicates over a first frequency band, the second service provider communicates over a second frequency band, and the first frequency band differs from the second frequency band.

18. The system of claim 10, wherein at least a portion of the first set of backhaul communication links comprise wired communication links and at least a portion of the second set of backhaul communication links comprise wired communication links.

* * * * *